3,767,687
PROCESS FOR REMOVING DISSOLVED ORGANIC
LEAD COMPOUNDS FROM AQUEOUS MEDIA
Bernard Noble Harris, Landenberg, Pa., assignor to E. I.
du Pont de Nemours and Company, Wilmington, Del.
No Drawing. Filed Feb. 4, 1972, Ser. No. 223,765
Int. Cl. C07f 7/24, 7/26
U.S. Cl. 260—437 R                                    10 Claims

ABSTRACT OF THE DISCLOSURE

Process for treating an aqueous medium containing dissolved organic lead compounds, for example, aqueous effluent from the manufacture of tetraalkyllead, with activated lead produced by extracting the non-lead component from a lead alloy, for example, NaPb, to substantially reduce the level of dissolved organic lead compounds in the aqueous medium.

BACKGROUND OF THE INVENTION

(1) Field of the invention

This invention relates to a process for treating aqueous media which contain substantial amounts of dissolved organic lead compounds.

(2) Description of the prior art

Aqueous effluents from tetraalkyllead manufacturing processes usually contain dissolved organic and inorganic lead compounds. The dissolved organic lead content can amount to 100 to 100,000 p.p.m., the dissolved inorganic lead content, to as much as 4,000 p.p.m.

It is known that water soluble organic lead compounds can be formed from tetraalkyllead compounds under acidic or oxidizing conditions. For example, the aeration or oxygen purification of tetraalkyllead compounds in the presence of water leads to the formation of some soluble trialkyllead compounds. Moreover, the transalkylation of a mixture of tetraalkyllead compounds in contact with a Lewis acid to form tetra(mixed alkyl)lead compounds usually is accompanied by the formation of water soluble alkyllead compounds.

Disposal of the aqueous effluents may provide pollution problems because of their high lead contents and, in addition, may result in undesirable loss of lead.

Calingaert et al. in J. Am. Chem. Soc., 70, 3902 (1948) disclose the decomposition of hydroxides, halides and carbonates of trialkyllead compounds by steam distillation to form tetraalkyllead compounds, inorganic lead compounds and alkyl halides or hydrocarbons. These decompositions do not go to completion and are relatively slow, requiring 2 to 8 hours to achieve substantial decomposition.

U.S. Pat. 3,308,061 discloses the removal of soluble organolead compounds from aqueous effluents produced in the manufacture of alkyllead compounds by treating the effluents with ozone at a pH of 8.0 to 9.5. Such a treatment, using a high molar ozone to lead ratio, may be expensive and may preclude recovery of alkyllead from the effluent.

Processes for lowering the concentration of dissolved inorganic lead in aqueous effluents are known. Canadian Pat. 572,192 discloses the removal of inorganic lead as its carbonate at a pH of 8.0–9.5. Although this method can reduce inorganic lead to 2–4 p.p.m., it does not materially affect the level of lead present as alkyllead cations.

SUMMARY OF THE INVENTION

It is an object of this invention to provide a simple, economical and commercially practical process for treating aqueous effluents or media containing dissolved alkyllead compounds so as to reduce the content of soluble lead therein without introducing objectionable substances into the effluent. It is another object to provide such a process which can be integrated with commercial processes for the manufacture of tetraalkyllead compounds. Still another object is to provide such an integratable process which can be used to reduce the soluble organolead compounds in the aqueous effluent to a low level in a single treatment. It is a further object to provide such an integratable process whereby lead can be recovered from aqueous effluent as tetraalkyllead.

In summary, the present invention resides in a process whereby an aqueous medium containing a soluble alkyllead compound is contacted with at least a catalytic amount of activated lead until a substantial portion of the dissolved alkyllead compound is converted to a water insoluble organic lead product which then can be separated from the aqueous medium. The activated lead is produced by extracting at least a part of the non-lead component from a lead alloy.

DETAILED DESCRIPTION OF THE INVENTION

This invention is based on the discovery that activated lead is a highly effective catalyst for the substantially complete conversion, within a reasonable time, of water soluble alkyllead compounds to water insoluble tetraalkyllead compounds. The invention is particularly useful for minimizing natural water pollution by aqueous effluents produced in the manufacture of tetraalkyllead antiknock compounds. Such effluents may contain substantial amounts of dissolved alkyllead compounds. This invention also provides for the conversion of such soluble compounds into valuable water insoluble tetraalkyllead compounds. The treated aqueous effluent can be recycled into process reuse. The process of this invention can be employed to reduce this dissolved lead content of aqueous effluents to a low level, for example, 30 p.p.m.

More specifically, the present invention is directed to a process for treating an aqueous effluent from the manufacture of alkyllead compounds and containing 100 to 100,000 p.p.m., usually about 10,000–30,000 p.p.m., of lead as dissolved organic lead not precipitatable by pH adjustment, and producing a treated effluent containing a reduced concentration of dissolved lead. By means of this invention, treated effluent lead levels of less than 100 p.p.m., for example, 30–100 p.p.m., can be obtained.

To carry out the process of this invention, activated lead is maintained in intimate contact with an aqueous solution of a soluble alkyllead compound for such a time and at such a temperature until the dissolved lead is insolubilized and thereby reduced to a low level in the aqueous medium; the aqueous medium and the insoluble lead-containing material are then separated.

Activated lead useful in this process has a bulk density below that of normal solid lead. It is porous and, based on its porosity, has a much higher surface to mass relation than normal solid lead. Its general structure is that of a three dimensional lattice of lead. Such a structure can be produced by extracting elements other than lead from a lead alloy, in its solid state, with the lattice of lead occupying the molar volume of the lead alloy in a high surface to mass relationship. Conveniently, such elements can be alloying metals of greater electrochemical activity than lead. Most conveniently, the metals in lead alloys to be extracted are selected from alkali metal, such as lithium, potassium and, preferably, sodium, and from alkaline earth metals, such as calcium, magnesium and barium. The metals can be present in molar proportions covering the composition range of formable lead alloys. Preferably, the alloys have at least one atom of extractable metal per atom of lead.

Typical of useful extractable lead alloys are $LiPb$, $Li_5Pb_2$, $Li_3Pb$, $Li_{10}Pb_3$, $Li_7Pb_2$, $Li_4Pb$, $KPb_4$, $KPb_2$, $K_4Pb_9$, $K_2Pb$, $NaPb_3$, $NaPb$, $Na_2Pb$, $Na_5Pb_2$, $Na_{15}Pb_4$, $Mg_2Pb$, $CaPb_3$, $CaPb$, $Ca_2Pb$, $BaPb_3$ and $Ba_2Pb$. The sodium alloys are the preferred alkali metal alloys, and NaPb is preferred among these.

The extractable lead alloys can have more than one non-lead metal; mixtures of lead alloys also are useful. Typical of such alloys are alkali metal-alkaline earth metal-lead alloys, such as $Li_2MgPb$ and the sodium-magnesium-lead alloys.

The extractant for the lead alloy can be any liquid which is reactable with the lead-alloying metal. The liquid can have hydrogen atoms which are replaceable by the extractable metal, and it can have extractable halogen atoms. Examples of the first type are water, an alcohol or an acid; an example of the latter type is an alkyl halide. Preferred liquids are water and alkyl halides such as methyl chloride and ethyl chloride under liquefying pressure.

In carrying out the process of this invention, the activated lead should present a large contact area. The choice of lead alloy size and form determines how much contact surface is available. Agitation of the activated lead in the aqueous effluent reduces the contact time needed for dissolved lead reduction. As a standard of reference, activated lead derived by the ethyl chloride extraction of fractured 0.045 inch thick monosodium-lead alloy (10 wt. percent Na) in 1–5 times its wegiht of aqueous effluent effectively has been used to lower the dissolved alkyllead salts to less than 100 p.p.m. in 1.5–3 hours at a temperature of 75°–105° C.

Activated lead contact with aqueous effluent is maintained at a temperature within the range of about 20–120° C. Preferably, it is within the range 75–105° C. Contact time can range from 1.5 hours at the upper temperature to about 48 houurs at 20° C. At the preferred temperature, contact times usually range from 1.5–3 hours.

Activated lead contact with aqueous effluent is carried out at about pH 5–13. However, it is preferred to effect contact on the alkaline side, such as at a pH of 8–9.5, so as to effectively lower the concentration of both organic and inorganic dissolved lead. The inorganic dissolved lead may be present in the aqueous effluent being treated by the process of this invention and it also may be formed during the process itself. It is known that inorganic dissolved lead can be removed from solution at alkaline pH. The employment of an alkaline pH also serves to minimize corrosion if the process is carried out in steel vessels. By employing a pH of 8–9.5 in this process, the dissolved inorganic lead can be reduced to 2–4 p.p.m.

The precipitated or insolubilized lead-containing products of the process of this invention can be separated from the treated aqueous effluent by conventional methods, such as by settling, decantation, extraction with a water immiscible solvent for tetraalkyllead compounds, steam distillation, filtration or combinations of these. The preferred method of separating the lead-containing insoluble organic liquids, for example, tetraalkylleads, is steam distillation. Water in the distillate from a steam distillation in substantially free of dissolved lead. Precipitation of lead-containing products may be assisted by the addition of small amounts of flocculating agents which form fluocculent precipitates in alkaline solution; examples of such agents include salts of magnesium, aluminum, chromium, iron and zinc, and particularly ferric chloride or aluminum chloride. These agents are usually added as dilute aqueous solutions with agitation, ordinarily at a level of about 20–60 p.p.m.

Activated lead which is used in the process of this invention retains its catalytic activity so long as it is kept wet after its formation, and it can be used repeatedly to catalyze the decomposition of soluble alkyllead compounds. A preferred embodiment of this invention uses the aqueous lead sludge remaining after an alkyl chloride has been reacted with sodium-lead alloy and the reaction mass has been drowned in water. The reaction masses formed by reacting ethyl chloride or methyl chloride with monosodium lead alloy made according to well-known processes in commercial use provide such sludge. The sludge can be used as it exists after steam distilling tetraalkyllead from the reaction mass by simply mixing it with with the effluent to be treated and then steam distilling the mixture to separate and recover additional tetraalkyllead. Preferably, the aqueous effluent to be treated can be added to the drowned reaction mass before it is steam distilled and the tetraalkyllead produced from it can be recovered concurrently with the main body of tetraalkyllead. Most conveniently, the aqueous effluent can be used as drowning water for the alkyl chloride-alloy reaction mass, thereby avoiding the need for fresh water in the alkylation process.

The process of this invention is broadly applicable to the treatment of aqueous solutions, however formed, of soluble alkyllead compounds. The normal source of such solutions is waste effluent produced in the manufacture of tetraalkyllead compounds, including methods based on the alkylation of sodium lead alloys, electrolytic methods of alkylating lead, and alkyl group redistribution methods for producing mixed tetraalkyllead compounds.

This process is particularly applicable to the treatment of waste effluent from the manufacture of tetraethyllead by the reaction of sodium lead alloy with ethyl chloride; of tetramethyllead by the reaction of sodium lead alloy with methyl chloride in the presence of an aluminum halide; and of mixed methyl and ethyl alkyllead compounds by the redistribution of tetramethyllead and tetraethyllead mixtures with Lewis acid catalysts. All of these processes, together with the aeration purification process previously described, tend to produce in the aqueous effluent water soluble lead compounds not precipitatable by adjustment of pH to the alkaline range, for example, 8–9.5. Such compounds include those of the type $$R_{4-n}PbX_n$$

where R stands for methyl or ethyl, X for hydroxide or halide (such as fluoride or chloride) depending on the pH of the solution, and $n$ equals 1 or 2.

In the following examples, parts given are on a weight basis unless otherwise stated. Ppm. signifies parts per million of lead by weight based on the method described by S. R. Henderson and L.J. Snyder in Analytical Chemistry 33, 1172 (1961).

EXAMPLE 1

Part A

To an agitated equimolar mixture of tetraethyllead and tetramethyllead (the tetramethyllead was introduced as an 80% solution in toluene) was added 0.3 wt. percent of boron trifluoride diethyl etherate, based on the weight of the alkyllead. The reaction was carried out at room temperature. After five minutes, the reaction mixture was washed with 1% aqueous sodium hydroxide to remove the catalyst. The washed mixture of alkylleads was then blended in the usual manner with conventional requisite amounts of ethylenedibromide and/or ethylenedichloride, antioxidants and dye. The redistributed mixture analyzed as follows:

| Tetraalkyllead: | Mol percent |
|---|---|
| Tetramethyl | 4.2 |
| Trimethylethyl | 24.6 |
| Dimethyldiethyl | 42.4 |
| Methyltriethyl | 24.4 |
| Tetraethyl | 4.4 |

Part B 500 parts of aqueous effluent from Part A, produced by washing the reaction mixture with 1% aqueous sodium hydroxide, containing 9,500 p.p.m. of dissolved lead and having a pH of 7.5, were added to the aqueous sludge remaining after washing with distilled water the solids in 465 parts of a reaction mass which was produced by reacting, substantially completely, equimolar amounts of ethyl chloride and NaPb (10.08 wt. percent Na) to form tetraethyllead and by-product lead. 0.69 part of sodium hydroxide was added to compensate for the alkalinity lost in the sludge washings. The mixture was steam distilled until the water immiscible distillate, tetra(mixed methyl and ethyl)lead, no longer came over (1.5 hours). The treated aqueous effluent had a pH of 8.8 and contained 21 p.p.m. of dissolved lead. The distillate water contained no dissolved lead.

Part C 500 parts of the aqueous effluent from Part A (described in Part B) were added to 465 parts of the reaction mixture of 1 mole of NaPb and 1 mole of ethyl chloride. The mixture was steam distilled until water immiscible distillate no longer came over (1.5 hours). The treated effluent had a pH of 11.0 and contained 39 p.p.m. of dissolved lead and the distillate water contained no dissolved lead.

The treated aqueous effluent was decanted from the solids (sludge), another 500 parts of aqueous effluent from Part A were added to the solids, and the mixture was steam distilled. The treated effluent had a pH of 9.7 and contained 30 p.p.m. of dissolved lead.

Again, the solids (sludge) were separated from the treated effluent. Another 500 parts of aqueous effluent from Part A were added, the mixture was steam distilled, and the treated effluent had a pH of 7.6 and contained 34 p.p.m. of dissolved lead.

The solids (sludge) were used a third time to treat another 500 parts of aqueous effluent from Part A. The mixture was allowed to stand overnight at 20° C. The supernatant liquid had a pH of 7.0 and contained 1,525 p.p.m. of dissolved lead. After steam distillation the treated effluent had a pH of 6.3 and contained 91 p.p.m. of dissolved lead.

EXAMPLE 2

574 parts of NaPb (10.08 wt. percent Na) alloy were leached under a nitrogen atmosphere with 500 part portions of distilled water until the pH of the treating water was reduced to 9.8. 500 parts of alkaline aqueous wash (produced as in Part A of Example 1 but having a pH of 9.8 and containing 11,750 p.p.m. of dissolved lead) were added to the leached alloy and the mixture was steam distilled. The residual water had a pH of 10.4 and contained 20 p.p.m. of dissolved lead. Two succeeding cycles each of decantation from solids and addition of 500 parts of fresh aqueous wash and steam distillation produced residual waters of pH 9.0 with 30 p.p.m. of dissolved lead and pH 8.5 with 58 p.p.m. of dissolved lead.

EXAMPLE 3

500 parts of aqueous effluent containing 13,680 p.p.m. of dissolved lead were mixed with 384 parts of by-product lead remaining after steam distilling, for tetraethyllead recovery, the reaction mass produced by reacting, substantially completely, ethyl chloride and an equimolar amount of NaPb to form tetraethyllead and by-product lead. The mixture was steam distilled and produced residual water of pH 5.5 with 31 p.p.m. of dissolved lead.

Decanting off the residual water, mixing the same by-product lead with another 500 parts of aqueous effluent and steam distilling the mixture yielded residual water of pH 4.5 with 123 p.p.m. of dissolved lead.

EXAMPLE 4

Part A 300 parts of aqueous effluent produced as in Part A of Example 1 were steam distilled for three hours. Dissolved lead concentrations were determined at various stages during a three hour steam distillation.

Part B 86.6 parts of NaPb (10.08 wt. percent Na) were leached with distilled water until alkalinity was no longer generated in the water. An aqueous slurry of the resulting solids was mixed with 300 parts of aqueous effluent produced as in Part A. The mixture was steam distilled 1.5 hours with testing at intervals for dissolved lead. The results are given in Table I.

TABLE I

| Run | Lead-bearing component | Lead concentration, p.p.m. in water | | | | | |
|---|---|---|---|---|---|---|---|
| | | 0 hr. | 0.5 hr. | 1 hr. | 1.5 hrs. | 2 hrs. | 3 hrs. |
| A | $R_3Pb^+$ | 20,964 | | 8,350 | | 6,610 | 6,510 |
| | $R_2Pb^{++}$ | 13,474 | | 25,050 | | 19,750 | 16,600 |
| | $Pb^{++}$ | [1] Nil | | [1] Nil | | 76 | 162 |
| B | $R_3Pb^+$ | 18,670 | 1,292 | 1,204 | 252 | | |
| | $R_2Pb^{++}$ | 13,870 | 3,615 | 2,204 | 960 | | |
| | $Pb^{++}$ | 822 | 478 | [1] Nil | 564 | | |

[1] Nil=essentially 0.

In Part A, 67% of the dissolved organic lead remained after 3 hours of steam distillation. In Part B, representative of the present invention, only 4% remained after 1.5 hours.

EXAMPLE 5

4,100 parts of aqueous effluent (produced as in Part A of Example 1 but containing 11,800 p.p.m. of dissolved lead as alkyllead salts) were mixed with 3,500 parts of reaction mass containing tetramethyllead and lead sludge resulting from complete exhaustion of sodium in NaPb alloy by methyl chloride in the presence of graphite and aluminum chloride. 205 parts of toluene were added for tetraalkyllead stabilization. The mixture was steam distilled until water immiscible distillate no longer collected. Steam distillate water contained no dissolved lead. Residual water contained 44 p.p.m. of dissolved lead.

EXAMPLE 6

A solution of 30% glycerine in water, used as a cover for a stored tetraalkyllead antiknock composition, had a pH of 7.4 and contained 55,700 p.p.m. of dissolved lead. 500 parts of this solution were mixed with 463 parts of the reaction mass produced by reacting, substantially completely, equimolar amounts of ethyl chloride and NaPb to form tetraethyllead and by-product lead. The mixture was steam distilled until organic lead no longer passed over. The residual water had a pH of 7.6 and contained 219 p.p.m. of dissolved lead.

The embodiments of the invention in which an exclusive property or privilege is claimed are defined as follows:

1. Process for treating an aqueous effluent which is produced directly or indirectly from the manufacture of alkyllead compounds and which contains at least 100 p.p.m. of lead as dissolved organic lead compounds not precipitatable by pH adjustment, which process comprises intimately contacting the effluent with activated lead to produce a water insoluble lead-containing product and a treated aqueous effluent containing a reduced concentration of lead as dissolved organic lead compounds.

2. The process of claim 1 wherein the activated lead is obtained by extracting a non-lead element from a lead alloy.

3. The process of claim 2 wherein the lead alloy is an alkali metal or alkaline earth metal lead alloy.

4. The process of claim 2 wherein the activated lead is obtained by extracting a sodium-lead alloy with water, methyl chloride or ethyl chloride.

5. The process of claim 4 wherein the sodium-lead alloy is NaPb containing 10 wt. percent sodium.

6. The process of claim 1 wherein the water insoluble lead-containing product is a tetraalkyllead which is separated from the treated aqueous effluent by steam distillation.

7. The process of claim 4 wherein the aqueous effluent is effluent containing dissolved alkyllead ions and is obtained by water washing the product obtained by the redistribution of tetramethyllead and tetraethyllead in the presence of a Lewis acid, the contacting is carried out at 75–105° C. for 1.5–3 hours, and the water insoluble lead-containing product is tetra (mixed methyl and ethyl) lead which is separated from the treated effluent by steam distillation.

8. The process of claim 7 wherein the activated lead is sludge produced by reacting methyl chloride or ethyl chloride with monosodium-lead alloy.

9. The process of claim 7 wherein the pH of the effluent is adjusted to 8–9.5.

10. The process of claim 1 wherein the treated aqueous effluent contains less than 100 p.p.m. of lead as dissolved organic lead components.

References Cited

UNITED STATES PATENTS

| 3,143,481 | 8/1964 | Croxton et al. | 260—437 R X |
| 3,308,061 | 3/1967 | Collier | 260—437 R X |
| 3,384,559 | 5/1968 | Hopkins | 260—437 R X |

FOREIGN PATENTS

| 572,192 | 3/1959 | Canada. |

DANIEL E. WYMAN, Primary Examiner

A. P. DEMERS, Assistant Examiner

U.S. Cl. X.R.

260—435 R